(12) United States Patent
Baughman et al.

(10) Patent No.: US 8,138,443 B2
(45) Date of Patent: Mar. 20, 2012

(54) SEALING SYSTEMS

(75) Inventors: Brian G. Baughman, Phoenix, AZ (US);
Joshua Robinson, Mesa, AZ (US)

(73) Assignee: Honeywell International Inc.,
Morristown, NJ (US)

( * ) Notice: Subject to any disclaimer, the term of this patent is extended or adjusted under 35 U.S.C. 154(b) by 821 days.

(21) Appl. No.: 12/254,593

(22) Filed: Oct. 20, 2008

(65) Prior Publication Data

US 2010/0096810 A1     Apr. 22, 2010

(51) Int. Cl.
*B23K 15/06* (2006.01)
(52) U.S. Cl. ............... 219/121.22; 219/121.13
(58) Field of Classification Search ............. 219/121.22, 219/121.13, 121.14, 121.15, 121.21; 277/589
See application file for complete search history.

(56) References Cited

U.S. PATENT DOCUMENTS

| | | | |
|---|---|---|---|
| 2,960,457 A * | 11/1960 | Kuhlman | 118/723 EB |
| 3,165,619 A | 1/1965 | Cohen | |
| 3,206,217 A * | 9/1965 | Shepard et al. | 277/520 |
| 3,952,568 A | 4/1976 | Wareing et al. | |
| 4,054,044 A | 10/1977 | Wareing et al. | |
| 4,072,844 A | 2/1978 | Sayegh | |
| 4,164,641 A | 8/1979 | Scheffels et al. | |
| 4,358,657 A | 11/1982 | Steigerwald et al. | |
| 4,430,550 A | 2/1984 | de Sivry et al. | |
| 4,790,165 A | 12/1988 | Lievens et al. | |
| 5,050,416 A | 9/1991 | Gobin et al. | |
| 5,638,664 A * | 6/1997 | Levsen et al. | 53/512 |

* cited by examiner

*Primary Examiner* — Samuel M Heinrich
(74) *Attorney, Agent, or Firm* — Ingrassia Fisher & Lorenz, P.C.

(57) ABSTRACT

A sealing system includes two fittings, a compliant member, and a spring. The first fitting has two ends, a first cavity, and a first channel. The first channel extends from the first end to the first cavity, which is formed in the second end radially inwardly from an outer surface of the first fitting. The second fitting is disposed in the first cavity and has two ends, a second cavity, and a second channel. The first end is disposed in the first cavity, the second cavity is formed in the first end of the second fitting, and the second channel extends from the second cavity to the second end. The compliant member is disposed in the second cavity. The spring is disposed in the second cavity against the compliant member.

20 Claims, 5 Drawing Sheets

SEALING SYSTEMS

TECHNICAL FIELD

The inventive subject matter generally relates to sealing systems, and more particularly relates to sealing systems for use with a wire.

BACKGROUND

An electron beam welding process may employ a vacuum environment to prevent a beam of electrons formed for the welding process from dispersing. In such case, the vacuum environment may be created in a welding chamber within which a workpiece is disposed. A filler material, typically in the form of a filler wire, may be placed adjacent to or over the workpiece, and the beam of electrons may travel through the welding chamber and toward the workpiece. As the electrons impact the workpiece and the filler material, heat is created, which melts the workpiece and filler material to create the weld joint.

Although the aforementioned electron beam welding process produces adequate weld joints, certain aspects of the process may be improved. In particular, because the vacuum environment is formed in the welding chamber, the process takes place in a finite space. Accordingly, in some cases, an apparatus for feeding the filler wire towards the beam of electrons, may be too large in size for disposal within the welding chamber. Hence, the filler wire may be fed into the welding chamber through a port in a wall of the welding chamber, while the apparatus remains in a nearby non-vacuum environment. However, extending the filler wire through the port so that it extends between the vacuum environment and the non-vacuum environment may increase a likelihood of gas leakage into the vacuum environment.

Accordingly, it is desirable to have an improved sealing system for preventing gas leakage when a wire extends between two environments pressurized at different magnitudes, such as between vacuum and non-vacuum environments. In addition, it is desirable for the sealing system to be capable of sealing a vacuum environment to maintain the vacuum environment at about 0.0001 Torr. Moreover, it is desirable for the improved sealing system to be simple and inexpensive to implement and capable of being retrofitted into various existing systems in which an improved sealing system may be useful. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Sealing systems are provided. In an embodiment, a sealing system includes a first fitting, a second fitting, a compliant member, and a first spring. The first fitting has a first end, a second end, a first cavity, and a first channel. The first channel extends from the first end to the first cavity, and the first cavity is formed in the second end radially inwardly from an outer surface of the first fitting. The second fitting is disposed in the first cavity to form a substantially leak-tight seal and has a first end, a second end, a second cavity, and a second channel. The first end is disposed in the first cavity, the second cavity is formed in the first end of the second fitting, and the second channel extends from the second cavity to the second end. The compliant member is disposed in the second cavity and has a passage including a first end and a second end. The first end of the passage is substantially axially aligned with the first channel of the first fitting, and the second end of the passage is substantially axially aligned with the second channel of the second fitting. The first spring is disposed in the second cavity against the compliant member to compress the compliant member radially against a wire inserted through the passage of the compliant member.

In another embodiment, by way of example only, a sealing system includes a first fitting, a second fitting, a compliant member, and a first spring. The first fitting has a first end, a second end, a first cavity, and a first channel. The first channel extends from the first end to the first cavity, and the first cavity is formed in the second end radially inwardly from an outer surface of the first fitting. The second fitting is disposed in the first cavity to form a substantially leak-tight seal and has a first end, a second end, a second cavity, and a second channel. The first end is disposed in the first cavity, the second cavity is formed in the first end of the second fitting, and the second channel extends from the second cavity to the second end. The compliant member is disposed in the second cavity and has a passage including a first end and a second end. The first end of the passage is substantially axially aligned with the first channel of the first fitting, and the second end of the passage is substantially axially aligned with the second channel of the second fitting. The first spring is disposed in the second cavity against the compliant member to compress the compliant member radially against a wire inserted through the passage of the compliant member.

In another embodiment, by way of example only, a sealing system includes a first fitting, a second fitting, a first compliant member, and a first spring. The first fitting has a first end, a second end, a first cavity, and a first channel. The first channel extends from the first end to the first cavity, and the first cavity is formed in the second end radially inwardly from an outer surface of the first fitting. The second fitting is disposed in the first cavity to form a substantially leak-tight seal and has a first end, a second end, a second cavity, and a second channel. The first end is disposed in the first cavity, and the second cavity is formed in the first end of the second fitting and defined, in part, by an axial surface. The second channel extends from the second cavity to the second end, and a portion of the second fitting is disposed in the first cavity to form a substantially leak-tight seal. The first compliant member is disposed in the second cavity and has an axial surface and a passage including a first end and a second end. The first end of the passage is substantially axially aligned with the first channel of the first fitting, and the second end of the passage is substantially axially aligned with the second channel of the second fitting. The first spring is disposed in the second cavity between the axial surface of the second fitting and the axial surface of the first compliant member to compress the first compliant member radially against a wire inserted through the passage of the first compliant member.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
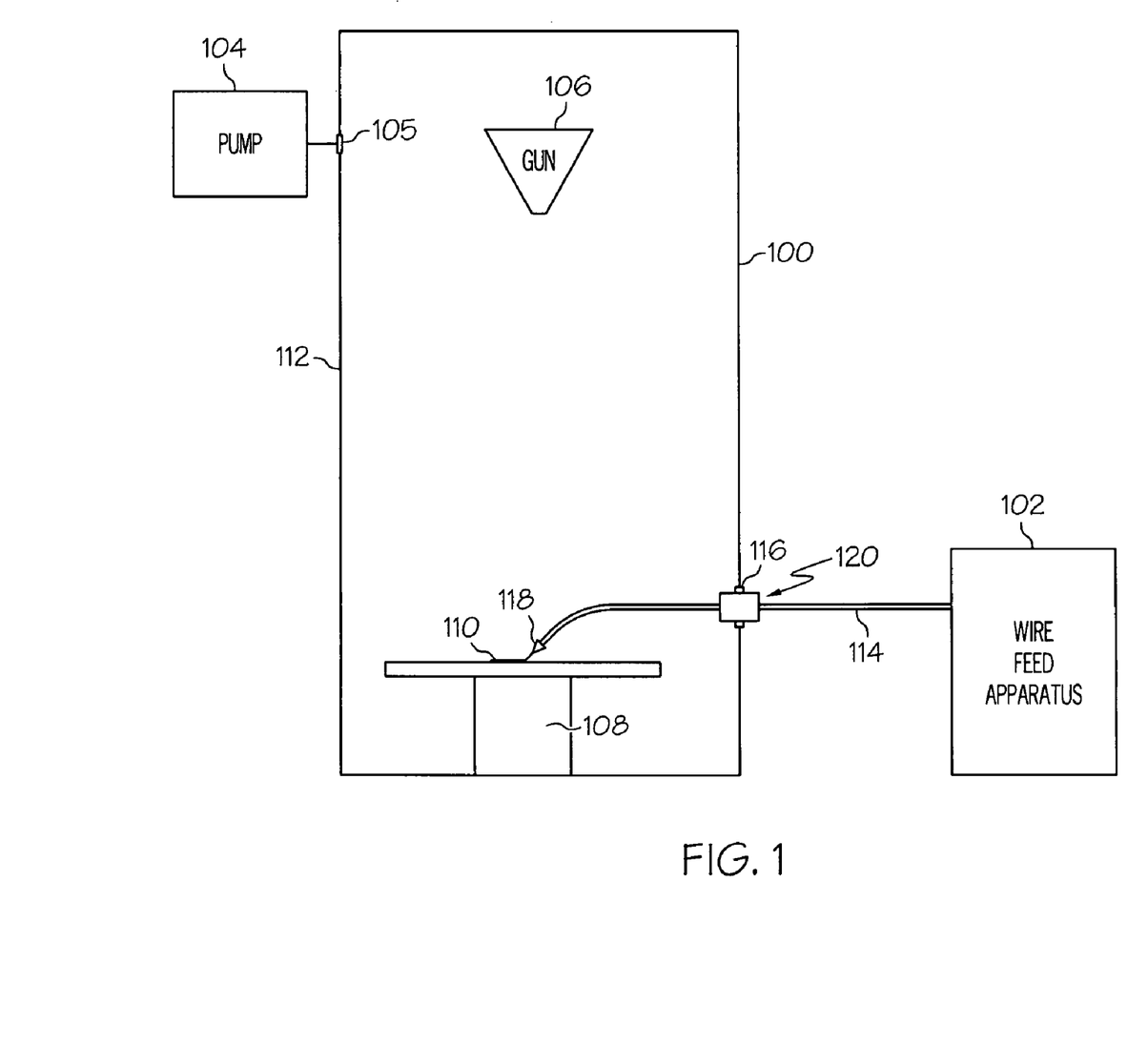
FIG. 1 is a simplified schematic of a welding chamber and a wire feed apparatus, according to an embodiment.

FIG. 1 is a simplified schematic of a welding chamber 100 and a wire feed apparatus 102, according to an embodiment. The welding chamber 100 may be configured to house at least an electron beam gun 106, a workpiece holder 108, and a workpiece 110 and to form a substantially leak-proof environment within which a vacuum is maintained. In accordance with an embodiment, the welding chamber 100 may be spherical, cubical or another three-dimensional shape. In another embodiment, the welding chamber 100 may have a largest width in a range of from about 1 m to about 3 m, a largest height in a range of from about 1 m to about 3 m, and a largest length in a range of from about 1 m to about 3 m. In other embodiments, the welding chamber 100 may be larger or smaller than the aforementioned ranges. To maintain structural integrity when the vacuum environment is created in the welding chamber 100, the welding chamber 100 may include walls 112 comprising materials capable of withstanding exposure to pressures of 100 millipascals or less, and preferably about 0 Pa. Suitable materials include, but are not limited to, stainless steel, carbon or alloyed steel, and cast iron. The walls 112 may have a thickness in a range of from about 2 cm to about 10 cm, in an embodiment. In other embodiments, the thicknesses may be greater or less than the aforementioned range. In any case, the thickness of the walls 112 may depend on the size of the welding chamber 100 and/or the materials from which the walls 112 are made.

The electron beam gun 106 is configured to produce a beam of high energy electrons that is directed at the workpiece 108. In this regard, the electron beam gun 106 may be disposed over the workpiece holder 108, and hence, the workpiece 110. Although not specifically shown, the electron beam gun 106 generally includes a cathode emitter that is supplied with energy from an energy source and produces electrons in response to the energy supply. The electrons may pass through an anode and coils, which operate together to cause the electrons to focus into a beam. The beam is then used to heat and/or melt the workpiece 110. According to an embodiment, the electron beam gun 106 is disposed at one end of the welding chamber 100 and the workpiece holder 108 is disposed at an opposite end of the welding chamber 100. In another embodiment, the electron beam gun 106 and the workpiece holder 108 are placed adjacent to each other. In accordance with another embodiment, the electron beam gun 106 has a direct line of sight to the workpiece holder 108. No matter the particular embodiment, a distance between the electron beam gun 106 and a surface of the workpiece 110 may be in a range of from about 5 cm to about 60 cm. In other embodiments, the distance may be greater or less than the aforementioned range.

According to an embodiment, the vacuum environment within the welding chamber may be produced by a pump 104. In an embodiment, the pump 104 may be a remote device capable of removing gas from the welding chamber 100. For example, the pump 104 may be employed to create a vacuum (e.g., an atmosphere having a pressure of 100 millipascals or less, and preferably about 0 Pa). Suitable pumps for removing gas include roughing, and diffusion type of pumps. In accordance with an embodiment, the pump 104 draws a vacuum through an opening 105 in one of the walls 112. Although the opening 105 is shown as being located adjacent to the electron beam gun 106 in FIG. 1, the opening 105 may be located at any other location on the walls 112, in other embodiments.

A filler material may be employed to improve a weld joint formed on the workpiece 110. In an embodiment, either weld or braze alloys may be used. The filler material may be a metal alloy, comprising nickel, cobalt, steel, stainless steel, aluminum, or other materials suitable for use in welding or brazing. In accordance with an embodiment, the filler material is provided as a wire 114 from the wire feed apparatus 102. The filler wire 114 may have a diameter in a range of from about 0.5 mm to about 1.5 mm, according to an embodiment. In other embodiments, the filler wire 114 may be thicker or thinner than the aforementioned range. In any case, the filler wire 114 originates from the wire feed apparatus 102 and extends through a port 116 located on a wall 112 of the welding chamber 102. A first end 118 of the filler wire 114 is placed over or adjacent to a location on the workpiece 110 to be welded.

Figure 2:
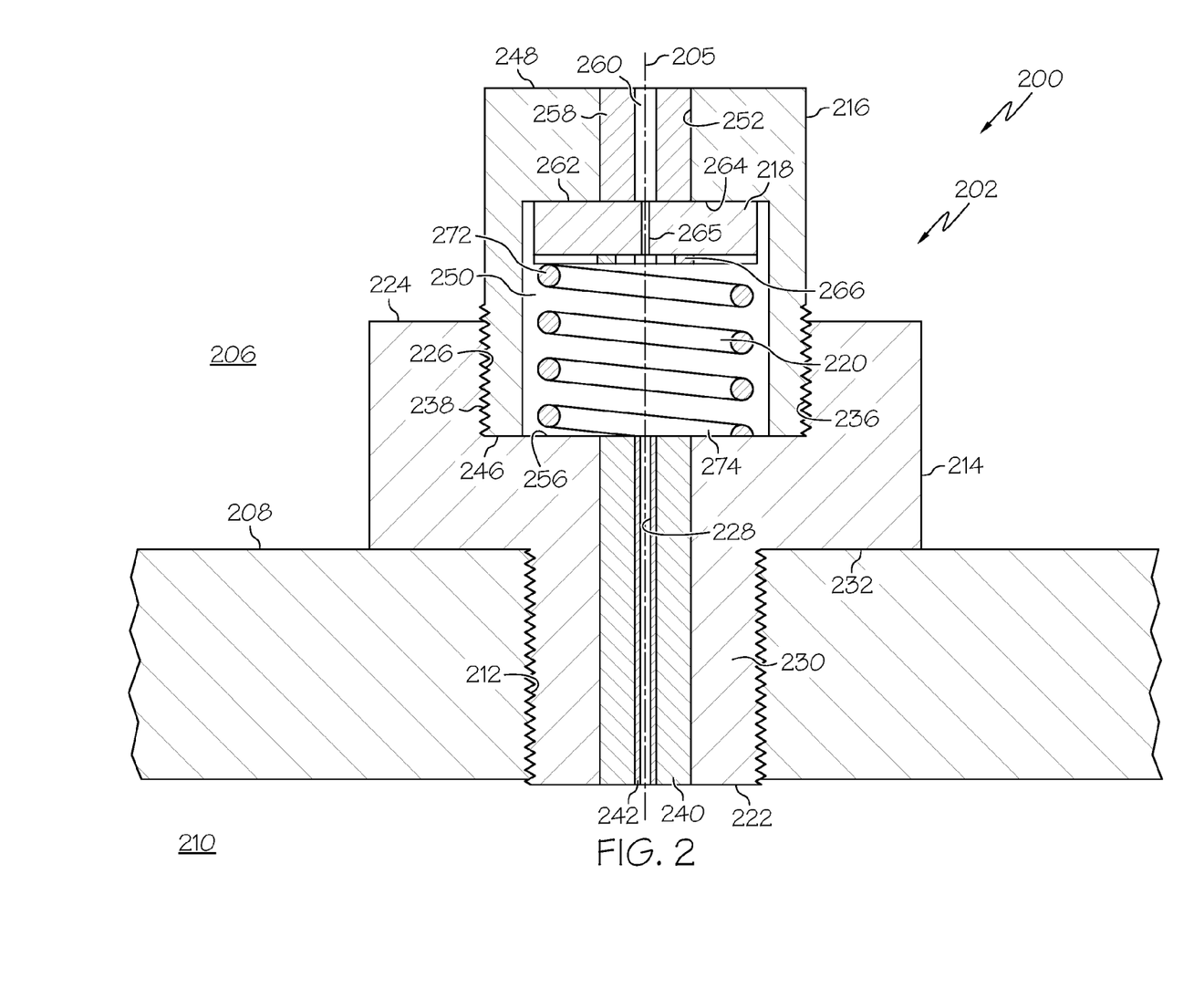
FIG. 2 is a cross-sectional view of a sealing system, according to an embodiment.

To prevent vacuum leakage that could occur through the port 116 in the space between the filler wire 114 and the wall 112 of the welding chamber 102, a sealing system 120 may be included, in accordance with an embodiment. FIG. 2 is a cross-sectional view of a sealing system 200, according to an embodiment. The sealing system 200 generally includes a wire seal assembly 202 through which a wire 205 extends, in an embodiment. The wire seal assembly 202 may be disposed on or through a first side 206 of a wall 208. In accordance with an embodiment, the first side 206 of the wall 208 may be adjacent to a vacuum environment and a second side 210 of the wall 208 may be adjacent to a non-vacuum environment. In another embodiment, the first side 206 of the wall 208 is adjacent to a non-vacuum environment, and the second side 210 of the wall 208 is adjacent to a vacuum environment. In still another embodiment, the first side 206 of the wall 208 and the second side 210 of the wall 208 may be non-vacuum environments, however, the first side 206 may be a space within which a particular pressurized environment is to be maintained. The wall 208 may be a wall included as part of a welding chamber (not shown) and includes a port 212 that provides communication between the welding chamber and an external environment, in an embodiment.

According to an embodiment, the sealing system 200 includes a first fitting 214, a second fitting 216, a compliant member 218, and a spring 220. The first fitting 214 is adapted to couple with the second fitting 216 and to maintain the compliant member 218 and the spring 220 between the first fitting 214 and the second fitting 216. Additionally, the first fitting 214 also couples the sealing system 200 to the wall 208. In accordance with an embodiment, the first fitting 214 may be comprised of material that maintains structural integrity when exposed to a certain environment. For example, the first fitting 214 may be subjected to a vacuum environment, in some cases, and thus, may be made of a material that can withstand the vacuum environment. Suitable materials include, but are not limited to steel, stainless steel, copper, and nickel-based alloys. In another example, the first fitting 214 may be exposed to high temperatures (e.g., temperatures greater than about 200° C.) and may be made of materials that are capable of resisting thermal degradation when exposed to such temperatures. Examples of suitable materials include, but are not limited to, tungsten carbide and cobalt alloys.

The first fitting 214 has a first end 222, a second end 224, a first cavity 226, and a first channel 228. The first end 222 is located on an axially-extending projection 230 of the first fitting 214. In accordance with an embodiment, the axially-extending projection 230 may extend through the port 212 and thus, may have an outer diameter that is slightly smaller than a diameter of the port 212. For example, the outer diameter of the axially-extending projection 230 may be in a range of from about 1 cm to about 3 cm, and the diameter of the port 212 may be in a range of from about 1 cm to about 3 cm. In other embodiments, the diameters may be larger or smaller than the aforementioned ranges. The axially-extending projection 230 may have an axial length that is substantially equal to (e.g., ±0.05 mm) a length of the port 212, in an embodiment. In another embodiment, the axially-extending projection 230 may have an axial length that is shorter or longer than the length of the port 212.

Figure 3:
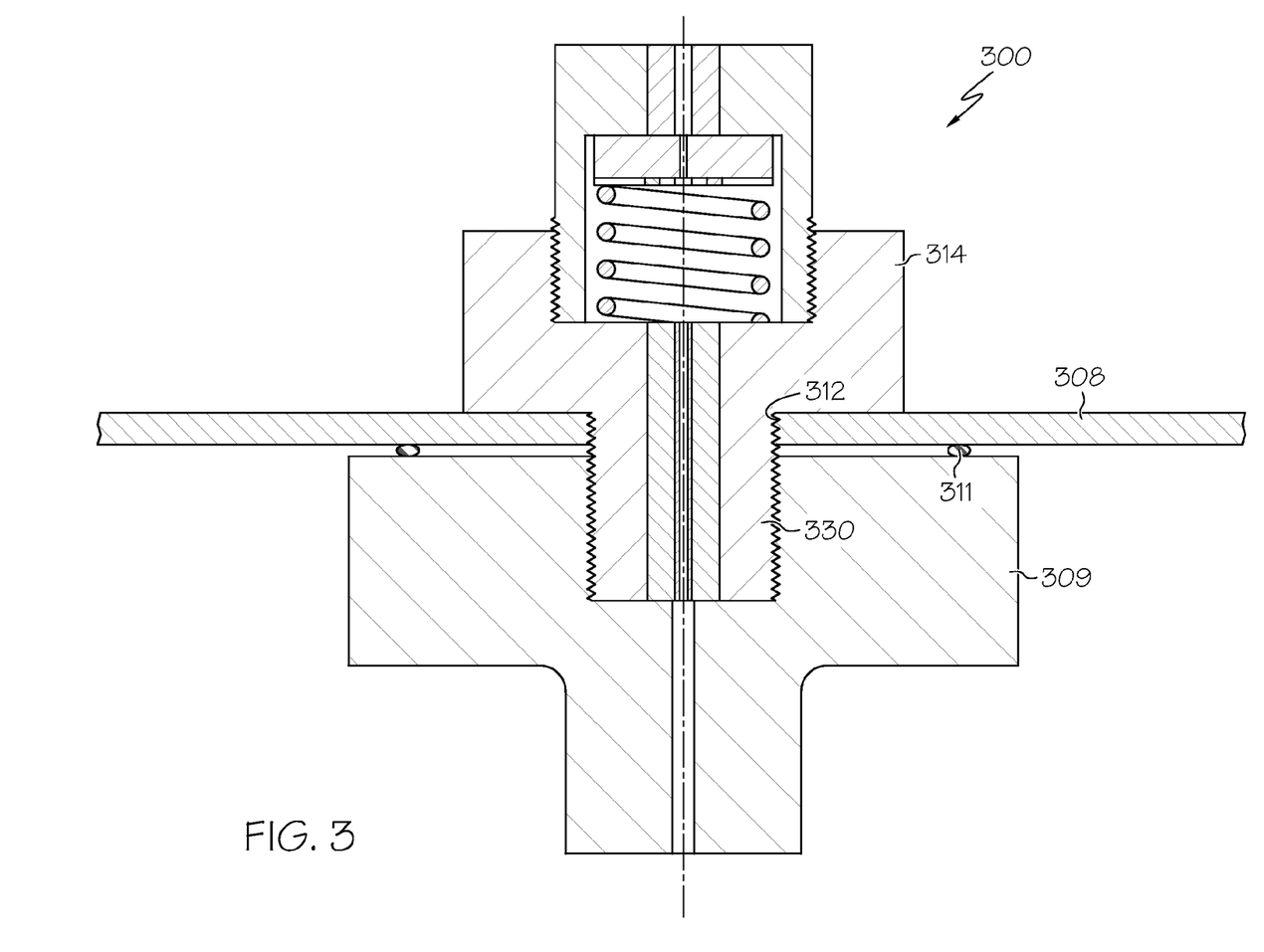
FIG. 3 is a cross-sectional view of a sealing system, according to another embodiment.

FIG. 3 is a cross-sectional view of a sealing system 300, according to another embodiment. The sealing system 300 depicted in FIG. 3 is identical to sealing system 200 of FIG. 2, except that a wall 308 is relatively thinner than the wall 208 of FIG. 2, and a first fitting 314 of the system 300 includes an axially-extending projection 330 having an axial length that is longer than a length of a port 312 in the wall 308. In this embodiment, a nut 309 may be included on an opposite side of the wall 308 from the sealing system 300 in order to couple the sealing system 300 to the wall 308. In accordance with an embodiment, the nut 309 may couple to the first fitting 314. A sealing ring 311, such as an O-ring or other elastomeric-type seal, may be included between the nut 309 and the wall 308.

Returning to FIG. 2, in accordance with another embodiment, the first fitting 214 may be disposed adjacent to the wall 208. According to an embodiment, the first fitting 214 has a contact surface 232 that may be configured to lie substantially flush with the wall 208. In accordance with an embodiment, a washer (not shown) may be included between the contact surface 232 and the wall 208. In any case, the first fitting 214 includes a body section 234 that extends axially from the contact surface 232. The body section 234 has an outer diameter that is greater than the outer diameter of the axially-extending projection 230. For example, the outer diameter of the body section 234 may be in a range of from about 5 cm to about 8 cm, and the outer diameter of the axially-extending projection 230 may be in a range of from about 1 cm to about 3 cm. In other embodiments, the outer diameters may be larger or smaller than the aforementioned ranges. Although the outer diameter of the body section 234 may have a substantially uniform outer diameter along its axial length, this may not be the case in all embodiments. For example, the outer diameter of the body section 234 may vary along it axial length. According to an embodiment, the body section 234 may extend to the second end 224 of the first fitting 214. In one example, the body section 234 may have an axial length that is in a range of from about 5 cm to about 8 cm. In other embodiments, the axial length may be greater than or less than the aforementioned range.

The first cavity 226 is formed in the second end 224 of the first fitting 214. In an embodiment, the first cavity 226 may be located radially inwardly from an outer surface of the first fitting 214. In accordance with an embodiment, the first cavity 226 may be located radially inwardly from an outer surface of the body section 234. According to an embodiment, the first cavity 226 may have a diameter that is substantially equal to an outer diameter of at least a portion of the second fitting 216 that is inserted in the first cavity 226. For instance, the diameter of the first cavity 226 and the outer diameter of the inserted portion of the second fitting 216 may be in a range of from about 3 cm and about 6 cm. In other embodiments, the diameters may be greater or smaller than the aforementioned range. The first cavity 226 may also have a depth, in an embodiment. For example, the depth may be in a range of from about 2 cm to about 3 cm. In other embodiments, the depth may be greater or less than the aforementioned range. In yet other embodiments, the first cavity 226 may be defined by an axial surface 236 that is configured to form a substantially leak-tight seal with an outer surface 238 of the second fitting 216. In one embodiment, the inner surface 234 defining the first cavity 226 and the outer surface 238 of the second fitting each includes threading that corresponds with each other.

According to an embodiment, the first channel 228 extends from the first end 222 of the first fitting 214 to the first cavity 226. The first channel 228 may be sized to allow the wire 205 to extend therethrough, in an embodiment. For example, the first channel 228 may have a diameter in a range of from about 0.5 mm to about 2.2 mm. In another embodiment, the diameter may be larger or smaller than the aforementioned range. The first channel 228 may alternatively be configured to receive a wire guide 240, in an embodiment. In an embodiment, the wire guide 240 may have an axial length that extends from the first end 222 of the first fitting 214 to the first cavity 226. In another embodiment, the axial length of the wire guide 240 may be longer or shorter. In any case, the wire guide 240 is preferably press fit into the first channel 228 to form a substantially leak-tight seal with the first fitting 214. In this regard, the wire guide 240 may have an outer diameter that is substantially equal to the diameter of the first channel 228.

No matter the particular configuration, the wire guide 240 includes at least a passage 242 extending along its length, and the passage 242 may be configured to receive the wire 205. To prevent the wire guide 240 from becoming prematurely worn from friction contact with the wire 205, the wire guide 240 may include material resistant to wear. In an embodiment, the wire guide 240 may be comprised entirely of a wear-resistant material. In another embodiment, the wire guide 240 may include a coating of wear-resistant material lining its passage 242. Suitable wear-resistant materials include, but are not limited to, tungsten carbide, molybdenum, ceramic coatings, and thermoplastics.

As briefly mentioned above, a portion of the second fitting 216 is at least partially inserted into the first cavity 226. In an embodiment, the second fitting 216 may be comprised of material that maintains structural integrity when exposed to a certain environment. For example, the second fitting 216 may be subjected to a vacuum environment, in some cases, and thus, may be made of a material that can withstand the vacuum environment. Suitable materials include, but are not limited to steel, stainless steel, copper, and nickel-based alloys. In another example, the second fitting 216 may be exposed to high temperatures (e.g., temperatures greater than about 200° C.) and may be made of materials that are capable of resisting thermal degradation when exposed to such temperatures. Examples of suitable materials include, but are not limited to, tungsten carbide and cobalt alloys. The second fitting 216 may be made of materials that are substantially similar to that of the first fitting 214, in an embodiment. In other embodiments, the fittings 214, 216 may not be made of substantially similar materials.

The second fitting 216 has a first end 246, a second end 248, a second cavity 250, and a second channel 252. In accordance with an embodiment, the first end 246 is disposed in the first cavity 226 and may be flush with a radial surface 256 of the first cavity 226. However, in alternate embodiments, the first end 246 may be spaced apart from the radial surface 256. The second cavity 250 may be formed in the first end 246 of the second fitting 216 and may be configured to receive the compliant member 218 and the spring 220. In an embodiment, the second cavity 250 may have a diameter that is in a range of from about 2 cm to about 3 cm and an axial length in a range of from about 3 cm to about 4 cm. In other embodiments, the second cavity 250 may have a larger or smaller diameter and/or axial length.

According to an embodiment, the second channel 252 extends from the second cavity 250 to the second end 248 of the second fitting 216. The second channel 252 may be sized to allow the wire 205 to extend therethrough, in an embodiment. For example, the second channel 252 may have a diameter in a range of from about 0.5 mm to about 2.2 mm. In another embodiment, the diameter may be larger or smaller than the aforementioned range. The second channel 252 may alternatively be configured to receive a wire guide 258, in an embodiment. In an embodiment, the wire guide 258 may have an axial length that extends from a radial surface 264 of the second cavity 250 to the second end 248 of the second fitting 216. In other embodiments, the axial length of the wire guide 258 may be longer or shorter. In any case, the wire guide 258 is preferably press fit into the second channel 252 to form a substantially leak-tight seal with the second fitting 216. In this regard, the wire guide 258 may have an outer diameter that is substantially equal to the diameter of the second channel 252.

No matter the particular configuration, the wire guide 258 at least includes a passage 260 extending along its length, and the passage 260 may be configured to receive the wire 205. To prevent the wire guide 258 from becoming prematurely worn from friction contact with the wire 205, the wire guide 258 may include material resistant to wear. In an embodiment, the wire guide 252 may be comprised entirely of a wear-resistant material. In another embodiment, the wire guide 258 may include a coating of wear-resistant material lining its passage 260. Suitable wear-resistant materials include, but are not limited to, tungsten carbide, molybdenum, ceramic coatings, and thermoplastics. In an embodiment, the wire guide 258 may be made of substantially similar material as the wire guide 242; however, this may not always be the case.

The compliant member 218 is disposed in the second cavity 250 and is configured to be compressed against the wire 205 to form a seal. In an embodiment, the compliant member 218 may include foam and/or rubber. For example, the foam and/or rubber may be neoprene. In another embodiment, the compliant member 218 may include butyl rubber, silicone rubber and foam rubber, and SBR rubber. The compliant member 218 includes a first end 266 and a second end 262. To further improve the substantially leak-tight seal, the second end 262 has a shape that corresponds with a shape of the radial surface 264 of the second cavity 250. In one example, the second end 262 of the compliant member 218 may be relatively flat and may lie flush against the second cavity radial surface 264. Although the compliant member 218 may be cylindrical in an embodiment, the compliant member 218 may be cubical, spherical, or another three-dimensional shape in other embodiments. In any case, to guide the wire 205 through the compliant member 218 during assembly, the compliant member 218 includes a passage 265 extending between the first end 266 and the second end 262 of the compliant member 218. The passage 265 has a diameter that is smaller than a diameter of the wire 205. In an embodiment, the passage 265 may have a diameter in a range of from about 0.3 mm to about 1 mm. In other embodiments, the passage 265 may be smaller or larger than the aforementioned range. According to an embodiment, an end of the passage 265 is substantially axially aligned with the first channel 228 of the first fitting 214, and an opposite end of the passage 265 is substantially axially aligned with the second channel 252 of the second fitting 216.

To ensure positioning of the compliant member 218 within the second cavity 250 and to cause the compliant member 218 to compress against the wire 205, the spring 220 is positioned against the compliant member 218. In accordance with an embodiment, the spring 220 may be configured to compress the compliant member 218 radially inwardly toward the wire 205, when the wire 205 is disposed in the passage 265 of the compliant member 218. In one example, the spring 220 is disposed in a compressed state between the compliant member 218 and the first fitting 214. According to an embodiment, the spring 220 has a first end 272 and a second end 274. The first end 272 of the spring 220 abuts the first end 266 of the compliant member 218, while the second end 274 of the spring 220 abuts the radial surface 256 of the first fitting first cavity 226. In such an embodiment, the spring 220 may comprise a spiral, and the wire 205 may extend through a center of the spiral. Particular dimensions of the spring 220 may depend on a desired spring stiffness value, a compressibility of the compliant member 218, the size of the second cavity 250, and/or a distance between the first end 266 of the compliant member 218 and the radial surface 256 of the first fitting first cavity 226. For example, the spring 220 may have a length in its uncompressed state that is substantially equal (e.g., ±0.5 mm) to the distance between the first end 266 of the compliant member 218 and the radial surface 256 of the first fitting first cavity 226. In accordance with an embodiment, the spring 220 may have a length in a range of from about 2 cm to about 3.5 cm and an outer diameter in a range of from about 1.5 cm to about 2.5 cm. However, in other embodiments, the length and outer diameter may be greater or less than the aforementioned range.

Figure 4:
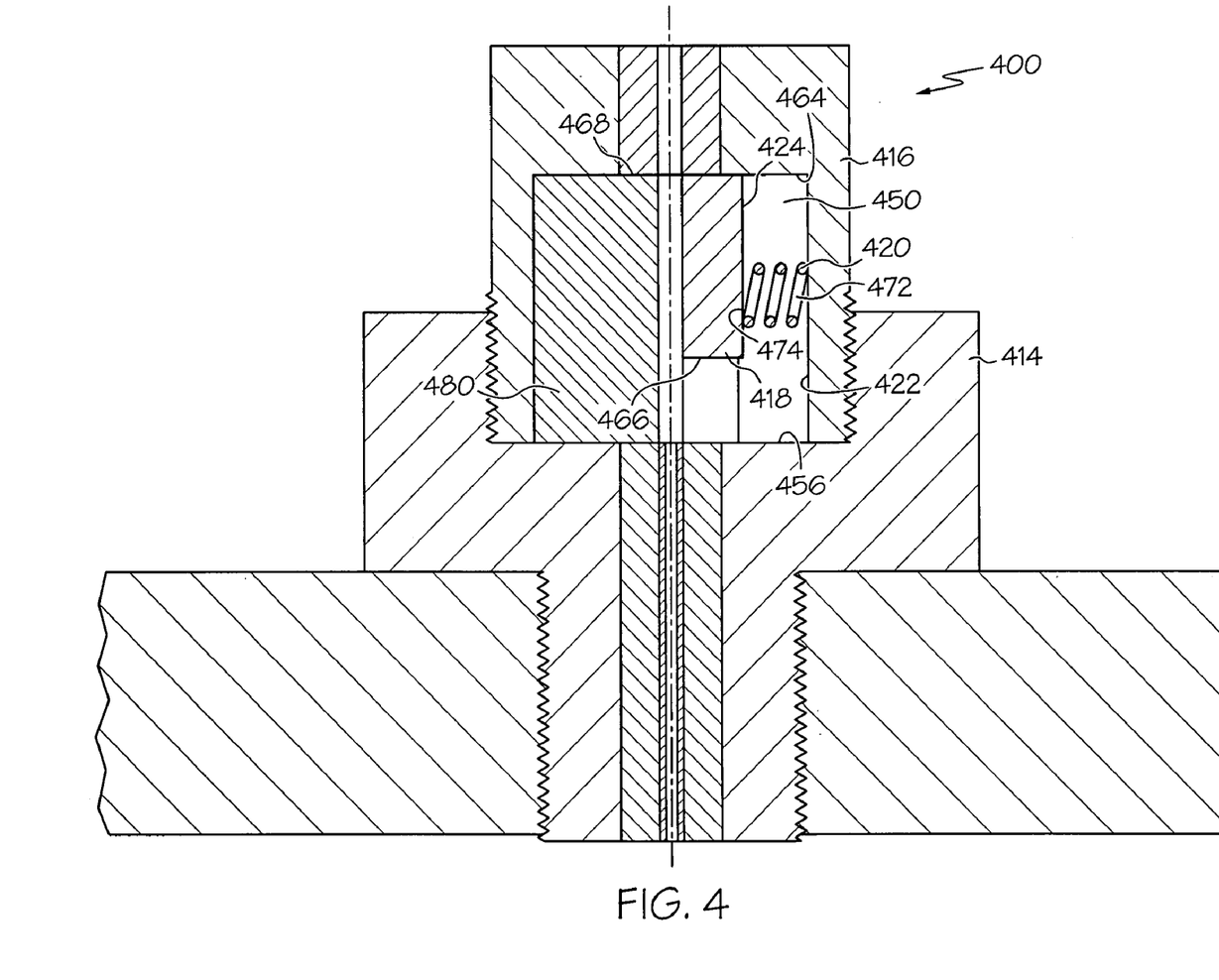
FIG. 4 is a cross-sectional view of a sealing system, according to still another embodiment.

FIG. 4 is a cross-sectional view of a sealing system 400, according to another embodiment. The sealing system 400 is substantially identical to the sealing system 200, illustrated in FIG. 2, except the sealing system 400 includes one or more springs 420 that extend radially between a second fitting 416 and a compliant member 418. For example, the one or more springs 420 each may have a first end 472 and a second end 474, and the first end 472 may abut an axial surface 422 of the second fitting 416, while the second end 474 may abut an axial surface 424 of the compliant member 418. According to an embodiment, the one or more springs 420 are disposed at an axial location that is about halfway between a first end 466 of the compliant member 418 and a second end 468 of the compliant member 418. In other embodiments, the axial location may be closer to the first end 466 of the compliant member 418. However, in still other embodiments, the axial location may be closer to the either the first end 466 or the second end 468 of the compliant member 418. According to an embodiment, the one or more springs 420 are disposed with their axes substantially perpendicular to (e.g., within ±0.5°) the axial surface 422 of the second fitting 416. In other embodiments, the one or more springs 420 are disposed with their axes at an angle that is not perpendicular to the axial surface 422 of the second fitting 416. Although one spring 420 is shown in FIG. 4, more may be included in other embodiments.

Figure 5:
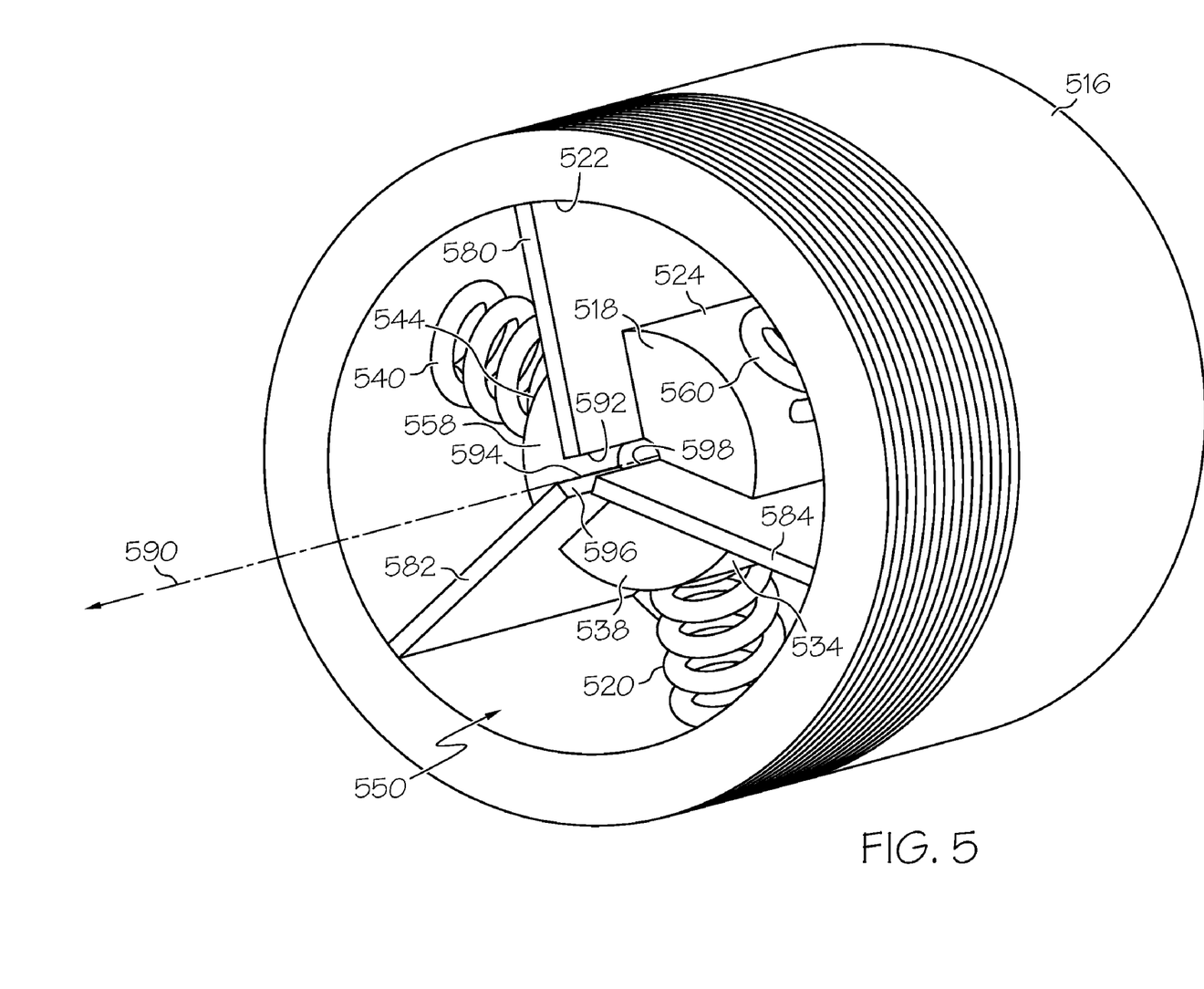
FIG. 5 is a perspective view of a fitting for use in a sealing system, according to an embodiment.

Referring also to FIG. 5, which is a perspective view of a second fitting 516, according to another embodiment, a second fitting 516 may be configured substantially identically to the second fitting 416, except that three springs 520, 540, 560 and three compliant members 518, 538, 558 are included. The compliant members 518, 538, 558 may be wedge-shaped, in an embodiment. In other embodiments, the compliant members 518, 538, 558 may have a different shape, such that when the members 518, 538, 558 are placed adjacent to each other, they form a ring. In any case, each spring 520, 540, 560 extends between an axial surface 524, 534, 544 of a complaint member 518, 538, 558 and an axial surface 522 of the second fitting 516, according to an embodiment. Although the springs 520, 540, 560, may be disposed with their axes at substantially identical angles relative to the axial surface 522 of the second fitting 516, the angles at which the springs 520, 540, 560 are positioned may differ between two or more of the springs 520, 540, 560.

The particular dimensions of the springs 420, 520, 540, 560 may depend on a desired spring stiffness value, a compressibility of the compliant member 418, 518, 538, 558 the size of the second cavities 450, 550, and/or a distance between the axial surfaces 422, 522 of the compliant members 418, 518 and the second fittings 416, 516. For example, the springs 420, 520, 540, 560 may have lengths that are substantially equal to (e.g., ±0.5 mm) the distance between the axial surfaces 422, 522 of the compliant members 418, 518, 538, 558 and the second fittings 416, 516. In accordance with an embodiment, the springs 420, 520, 540, 560 each may have a length in a range of from about 1 cm to about 2 cm and an outer diameter in a range of from about 0.5 cm to about 1 cm. However, in other embodiments, the lengths and/or outer diameters may be greater or less than the aforementioned range.

To secure the complaint member 418, 518, 538, 558 in a desired axial in position, one or more retaining plates (e.g., plate 480 in FIG. 4 and plates 580, 582, 584 in FIG. 5) may be included. In an embodiment, the retaining plates (e.g., plate 480 in FIG. 4) is configured to extend from a radial surface 456 of a first fitting 414 to a radial surface 464 of the second fitting 416. For example, in FIG. 5, three plates 580, 582, 584 are shown disposed between adjacent springs 520, 540, 560 and compliant members 518, 538, 558. In other embodiments, two plates may be included or more than three plates may be included. For simplicity, description will be provided with reference to retaining plate 480 in FIG. 4, however, it will be appreciated that the description may be applied to one or more of the retaining plates 580, 582, 584 in FIG. 5. In any case, the retaining plate 480 may be rectangular, in an embodiment and may have an axial length may be substantially equal to a depth of the second cavity 450 and a radial length that is less than a radius of the second cavity 450. According to an embodiment, the radial length may be in a range of from about 1 cm to about 1.5 cm. In other embodiments, the radial length may be longer or shorter than the aforementioned range. The retaining plate 480 may have a uniform thickness, in an embodiment. For example, the thickness of the retaining plate 480 may be in a range of from about 0.1 cm to about 0.25 cm. In other embodiments, the thickness may be more or less. In accordance with still other embodiments, the retaining plate 480 may have a varying thickness. In one example, the through-wire section may be thicker than the retaining section. The retaining plate 480 may comprise material that is capable of maintaining structural integrity when exposed to a vacuum environment, in some embodiments. In other embodiments, the retaining plate 480 may be comprised of material configured to steel. Suitable materials from which the retaining plate 480 may be comprised include, but are not limited to stainless steel, nickel-alloys, and hard plastics such as polyvinyl chloride.

When more than one retaining plate 580, 582, 584 is included, such as in FIG. 5, they may be positioned such that they appear to extend radially outwardly relative to a centerline 590 or axis of the second fitting 516. To allow a length of a wire to extend from the first fitting 514 and into the second fitting 516, a through-hole 592 may be at least partially defined between the axially-extending edges 594, 596, 598 of the retaining plates 580, 582, 584. In one embodiment, the through-hole 592 may be defined by the axially-extending edges 594, 596, 598 as having a diameter in a range of from about 0.3 mm to about 1 mm. In other embodiments, the diameter may be larger or smaller.

By surrounding the wire with a compliant material, a substantially leak-tight seal may be formed between the sealing system and the wire. Additionally, including springs that compress against the compliant material causes the compliant material to compress against the wire to form the seal. Thus, the likelihood of vacuum leakage through the sealing system may be reduced. In some configurations, the above-described sealing system may prevent vacuum leakage when a wire extends between a vacuum environment and a non-vacuum environment. In addition, the sealing system may be capable of sealing a vacuum environment to maintain the vacuum environment at about 0.0001 Torr. Moreover, the improved sealing system may be simple and inexpensive to implement and may capable of being retrofitted into various existing systems in which an improved sealing system may be useful.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A sealing system, comprising:
   a first fitting having a first end, a second end, a first cavity, and a first channel, the first channel extending from the first end of the first fitting to the first cavity, and the first cavity formed in the second end of the first fitting radially inwardly from an outer surface of the first fitting;
   a second fitting disposed in the first cavity to form a substantially leak-tight seal with the first fitting, the second fitting having a first end, a second end, a second cavity, and a second channel, the first end of the second fitting disposed in the first cavity, the second cavity formed in the first end of the second fitting, and the second channel extending from the second cavity to the second end of the second fitting;
   a compliant member disposed in the second cavity and having a passage including a first end and a second end, the first end of the passage substantially axially aligned with the first channel of the first fitting, and the second end of the passage substantially axially aligned with the second channel of the second fitting; and
   a first spring disposed in the second cavity against the compliant member to compress the compliant member radially against a wire inserted through the passage of the compliant member.

2. The sealing system of claim 1, wherein the first cavity is defined by an inner surface that includes a first threading, and an outer surface of the second fitting includes a second threading that corresponds with the first threading of the first fitting.

3. The sealing system of claim 1, wherein the first cavity of the first fitting includes a radial surface, and the first spring is disposed between the radial surface and the first end of the compliant member.

4. The sealing system of claim 1, wherein the second cavity of the second fitting includes an axial surface, the complaint member includes an axial surface, and the first spring is disposed between the axial surface of the second fitting and the axial surface of the compliant member.

5. The sealing system of claim 4, wherein a second spring is disposed in the second cavity and the second spring is disposed between the axial surface of the second fitting and the axial surface of the compliant member and the second spring is spaced apart from the first spring.

6. The sealing system of claim 4, further comprising a retaining plate disposed between a radial surface of the first cavity of the first fitting and a radial surface of the second fitting.

7. The sealing system of claim 1, further comprising a wire guide disposed in the first channel of the first fitting and adapted to receive the wire.

8. The sealing system of claim 7, wherein the wire guide comprises tungsten carbide.

9. The sealing system of claim 1, wherein the compliant member comprises one or more materials selected from the group consisting of rubber and foam.

10. A sealing system, comprising:
   a first fitting having a first end, a second end, a first cavity, and a first channel, the first channel extending from the first end of the first fitting to the first cavity, and the first cavity formed in the second end of the first fitting radially inwardly from an outer surface of the first fitting and including a radial surface;
   a second fitting disposed in the first cavity to form a substantially leak-tight seal with the first fitting and having a first end, a second end, a second cavity, and a second channel, the first end of the second fitting disposed in the first cavity, the second cavity formed in the first end of the second fitting, and the second channel extending from the second cavity to the second end of the second fitting;
   a compliant member disposed in the second cavity and having a passage including a first end and a second end, the first end of the passage substantially axially aligned with the first channel of the first fitting, and the second end of the passage substantially axially aligned with the second channel of the second fitting; and
   a first spring disposed in the second cavity between the radial surface of the first cavity and the first end of the compliant member and against the compliant member to compress the compliant member radially against a wire inserted through the passage of the compliant member.

11. The sealing system of claim 10, further comprising a nut coupled to the first fitting.

12. The sealing system of claim 11, further comprising a sealing ring included between the first fitting and the nut.

13. The sealing system of claim 10, wherein an inner surface defining the first cavity of the first fitting includes a first threading and the outer surface of the second fitting includes a second threading that corresponds with the first threading of the first fitting.

14. The sealing system of claim 10, wherein the first fitting includes an axially-extending projection and the first end of the first fitting is located on the axially-extending projection.

15. The sealing system of claim 10, wherein the compliant member comprises one or more materials selected from the group consisting of rubber and foam.

16. A sealing system, comprising:
   a first fitting having a first end, a second end, a first cavity, and a first channel, the first channel extending from the first end of the first fitting to the first cavity, and the first cavity formed in the second end of the first fitting radially inwardly from an outer surface of the first fitting;
   a second fitting disposed in the first cavity to form a substantially leak-tight seal with the first fitting and having a first end, a second end, a second cavity, and a second channel, the first end of the second fitting disposed in the first cavity, the second cavity formed in the first end of the second fitting and defined, in part, by a second cavity axial surface, the second channel extending from the second cavity to the second end;
   a first compliant member disposed in the second cavity and having a first compliant member axial surface and a passage including a first end and a second end, the first end of the passage substantially axially aligned with the first channel of the first fitting, and the second end of the passage substantially axially aligned with the second channel of the second fitting; and
   a first spring disposed in the second cavity between the second cavity axial surface and the first compliant member axial surface to compress the first compliant member radially against a wire inserted through the passage of the first compliant member.

17. The sealing system of claim 16, wherein a second spring is disposed in the second cavity and the second spring is disposed between the axial surface of the second fitting and the first compliant member axial surface and the second spring is spaced apart from the first spring.

18. The sealing system of claim 16, further comprising a retaining plate disposed between a radial surface of the first cavity of the first fitting and the first end of the first compliant member.

19. The sealing system of claim 16, further comprising:
   a second compliant member disposed in the second cavity; and
   a retaining plate disposed between the first compliant member and the second compliant member.

20. The sealing system of claim 16, wherein the compliant member comprises rubber and foam.

* * * * *